US009924099B2

United States Patent
Ito

(10) Patent No.: US 9,924,099 B2
(45) Date of Patent: Mar. 20, 2018

(54) IMAGING APPARATUS AND IMAGING METHOD WITH A DISTANCE DETECTOR

(71) Applicant: FUJIFILM Corporation, Tokyo (JP)

(72) Inventor: Hisao Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/591,546

(22) Filed: May 10, 2017

(65) Prior Publication Data

US 2017/0244900 A1    Aug. 24, 2017

Related U.S. Application Data

(63) Continuation of application No. PCT/JP2015/082773, filed on Nov. 20, 2015.

(30) Foreign Application Priority Data

Nov. 21, 2014 (JP) ................. 2014-236589

(51) Int. Cl.
*H04N 5/228* (2006.01)
*H04N 5/232* (2006.01)

(52) U.S. Cl.
CPC ....... *H04N 5/23287* (2013.01); *H04N 5/2329* (2013.01); *H04N 5/23258* (2013.01); *H04N 5/23267* (2013.01)

(58) Field of Classification Search
CPC ................................. H04N 5/23287
USPC ...................................... 348/208.1
See application file for complete search history.

(56) References Cited

U.S. PATENT DOCUMENTS

2008/0266406 A1\* 10/2008 McLeod ............ H04N 5/23248
                                                      348/208.16
2011/0157380 A1\* 6/2011 Yamazaki .......... H04N 5/23248
                                                      348/208.4

FOREIGN PATENT DOCUMENTS

JP    2002-359769 A    12/2002
JP    2005-173507 A    6/2005
JP    2010-103895 A    5/2010

OTHER PUBLICATIONS

International Search Report (PCT/ISA/210) dated Jan. 19, 2016 issued by the International Searching Authority in counterpart International Application No. PCT/JP2015/082773.

(Continued)

*Primary Examiner* — Usman Khan
(74) *Attorney, Agent, or Firm* — Sughrue Mion, PLLC

(57) ABSTRACT

An imaging apparatus includes: a distance detection unit that detects an object distance; a shake detection unit that detects an amount of shake of the imaging apparatus; a driving unit that moves an optical element or an imaging element included in an imaging optical system to correct an image blur caused by a shake of the imaging apparatus; and a control unit that calculates an amount of movement of the optical element or the imaging element moved by the driving unit based on the amount of shake detected by the shake detection unit and controls the driving unit, and the control unit directs the imaging element to continuously capture images in response to an imaging instruction and changes a correction gain which is used to calculate the amount of movement for each imaging operation, depending on the object distance detected by the distance detection unit.

17 Claims, 8 Drawing Sheets

(56) References Cited

OTHER PUBLICATIONS

Written Opinion (PCT/ISA/237) dated Jan. 19, 2016 issued by the International Searching Authority in counterpart International Application No. PCT/JP2015/082773.

* cited by examiner

IMAGING APPARATUS AND IMAGING METHOD WITH A DISTANCE DETECTOR

CROSS REFERENCE TO RELATED APPLICATION

This is a continuation of International Application No. PCT/JP2015/082773 filed on Nov. 20, 2015, and claims priority from Japanese Patent Application No. 2014-236589 filed on Nov. 21, 2014, the entire disclosures of which are incorporated herein by reference.

BACKGROUND OF THE INVENTION

1. Field of the Invention

The present invention relates to an imaging apparatus and an imaging method.

2. Description of the Related Art

An imaging apparatus having a function of correcting an image blur due to the shake of the imaging apparatus caused by, for example, a hand shake has been known. In the correction of the image blur, for example, the amount of rotational shake of the imaging apparatus is calculated on the basis of angular velocities about a pitch axis and a yaw axis which are perpendicular to an optical axis of an imaging optical system and a correction optical system or an imaging element is moved such that an image blur on an imaging surface of the imaging element is cancelled on the basis of the amount of rotational shake.

JP2002-359769A discloses an imaging apparatus which prepares a plurality of filter characteristics used for a filtering operation for removing, for example, noise other than a hand shake from the output of an angular velocity sensor, continuously performs a plurality of imaging operations while changing the filter characteristics, and obtains an image that has been appropriately corrected by the filter characteristics corresponding to the imaging skills of a user.

SUMMARY OF THE INVENTION

In high magnification imaging at a short object distance, the influence of a translational shake in addition to a rotational shake of an imaging apparatus increases and it is difficult to accurately detect the translational shake using only the angular velocity information of an angular velocity sensor. The accuracy of correction can be improved by providing an acceleration sensor for detecting the translational shake, calculating the amount of translational shake from the output of the acceleration sensor, and correcting an image. However, since the acceleration sensor is provided, there is a concern that the system will become complicated and computing load will increase.

The invention has been made in view of the above-mentioned problems and an object of the invention is to provide an imaging apparatus and an imaging method that can correct an image blur caused by a rotational shake and a translational shake with a simple structure.

According to an aspect of the invention, there is provided an imaging apparatus comprising: a distance detection unit that detects an object distance; a shake detection unit that detects an amount of shake of the imaging apparatus; a driving unit that moves an optical element or an imaging element included in an imaging optical system to correct an image blur caused by a shake of the imaging apparatus; and a control unit that calculates an amount of movement of the optical element or the imaging element moved by the driving unit based on the amount of shake detected by the shake detection unit and controls the driving unit. The control unit directs the imaging element to continuously capture images in response to an imaging instruction and changes a correction gain which is used to calculate the amount of movement for each imaging operation, depending on the object distance detected by the distance detection unit.

According to another aspect of the invention, there is provided an imaging method that detects the amount of shake of an imaging apparatus, calculates the amount of movement of an optical element or an imaging element included in an imaging optical system based on the amount of shake, and moves the optical element or the imaging element to acquire an image in which an image blur caused by a shake of the imaging apparatus is corrected. The imaging method comprises a distance detection step of detecting an object distance and an imaging step of continuously capturing images in response to an imaging instruction and changing a correction gain which is used to calculate the amount of movement for each imaging operation, depending on the object distance detected in the distance detection step.

According to the invention, it is possible to provide an imaging apparatus and an imaging method that can correct an image blur caused by a rotational shake and a translational shake with a simple structure.

EXPLANATION OF REFERENCES

Figure 1:
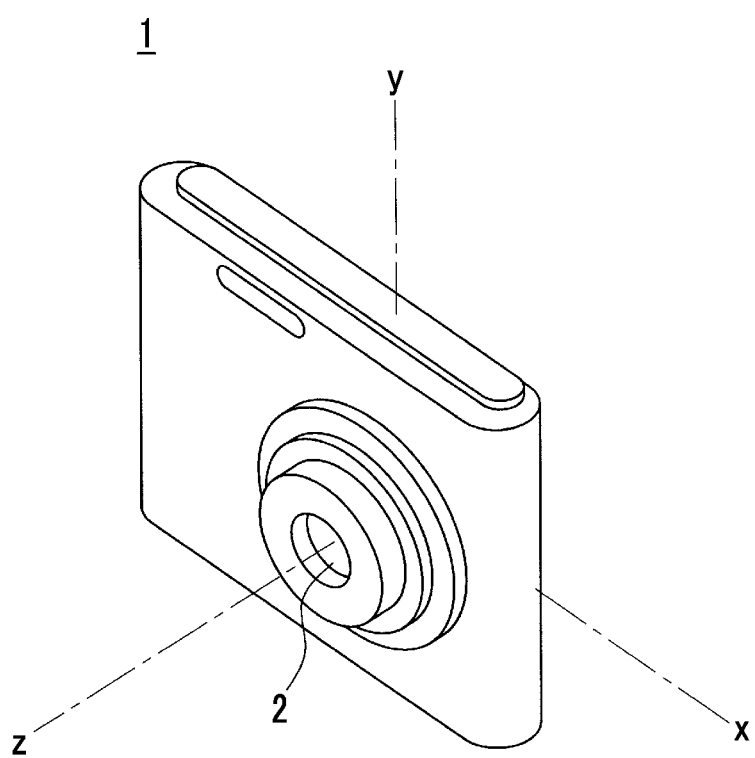
FIG. 1 is a diagram illustrating the outward appearance of an example of an imaging apparatus for describing an embodiment of the invention.

1: digital camera (imaging apparatus)
2: imaging optical system
3: imaging element
4: AF processing unit (evaluation unit)
5: focus driving unit
6: control unit
7: signal processing unit
8: operating unit
9: main memory
10: storage unit
11: display unit
20: shake detection unit
21: correction driving unit 24: correction lens
25: gain adjustment unit
26: correction control unit
27: position sensor

DESCRIPTION OF THE PREFERRED EMBODIMENTS

Figure 2:
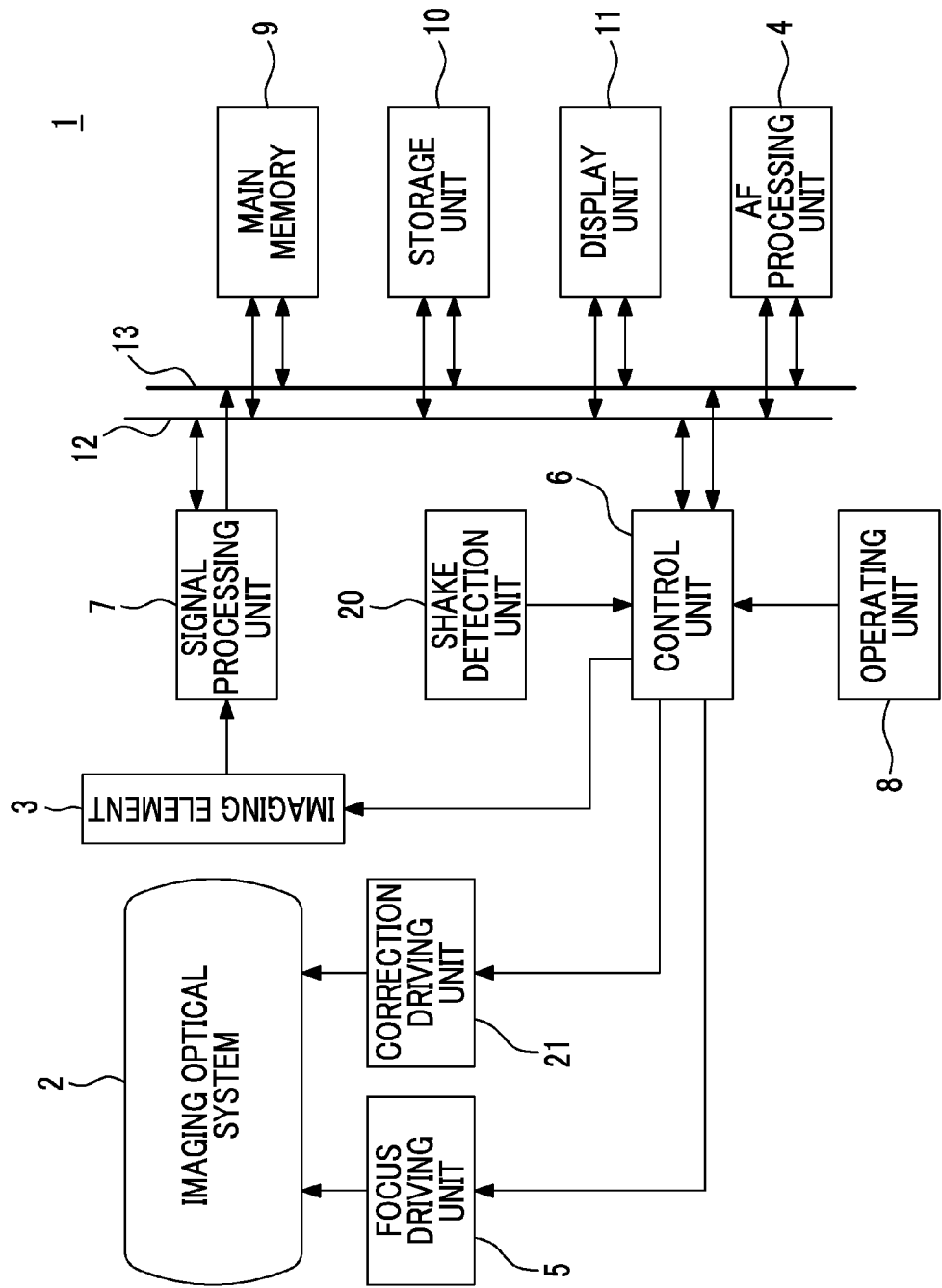
FIG. 2 is a block diagram illustrating the structure of the imaging apparatus illustrated in FIG. 1.

FIG. 1 illustrates the outward appearance of an example of an imaging apparatus for describing an embodiment of the invention and FIG. 2 illustrates the structure of the imaging apparatus illustrated in FIG. 1.

A digital camera 1 which is an example of the imaging apparatus illustrated in FIGS. 1 and 2 comprises an imaging optical system 2 including, for example, a focus lens for focusing, an imaging element 3 that captures an image of an object through the imaging optical system 2, an auto focus (AF) processing unit 4 that determines a focus position of the focus lens, a focus driving unit 5 that moves the focus lens to the focus position determined by the AF processing unit 4, and a control unit 6.

For example, a charge coupled device (CCD) image sensor or a complementary metal oxide semiconductor (CMOS) image sensor is used as the imaging element 3.

A signal processing unit 7 performs analog signal processing, such as a correlated double sampling process, for an output signal from the imaging element 3 to convert the output signal into a digital signal. Then, the signal processing unit 7 performs digital signal processing, such as an interpolation operation, a gamma correction operation, or an RGB/YC conversion process, for the digital signal obtained by converting the output signal from the imaging element 3 to generate image data.

The AF processing unit 4 determines the focus position of the focus lens, using an AF system, such as a contrast system, on the basis of the image data generated by the signal processing unit 7. The control unit 6 controls the focus driving unit 5 such that the focus lens is moved to the focus position determined by the AF processing unit 4.

An instruction signal, such as imaging instruction from a user, is input from an operating unit 8 to the control unit 6. The control unit 6 drives the imaging element 3 in response to the imaging instruction such that the imaging element 3 captures images.

The digital camera 1 includes a main memory 9 that stores, for example, setting information, a storage unit 10 including a storage medium, such as a memory card that stores the image data generated by the signal processing unit 7, and a display unit 11 including a display panel, such as a liquid crystal display panel that displays a menu or the image data generated by the signal processing unit 7.

The AF processing unit 4, the signal processing unit 7, the main memory 9, the storage unit 10, and the display unit 11 are connected to each other by a control bus 12 and a data bus 13 and are controlled by commands from the control unit 6.

The digital camera 1 further comprises a shake detection unit 20 that detects the shake of the digital camera 1 and a correction driving unit 21 that corrects an image blur on an imaging surface of the imaging element 3 due to the shake of the digital camera 1.

Figure 3:
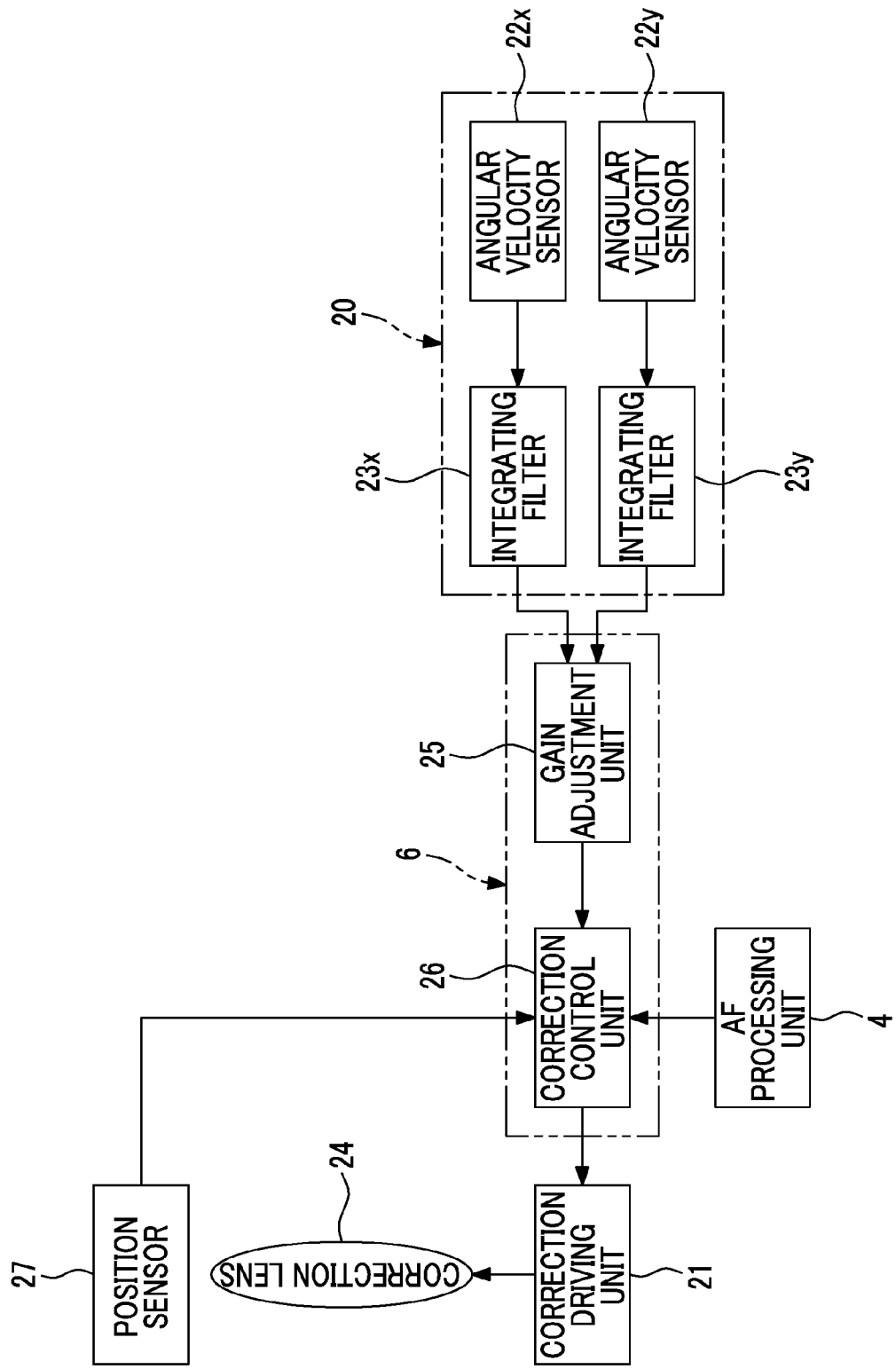
FIG. 3 is a block diagram illustrating the structure of an image blur correction system of the imaging apparatus illustrated in FIG. 1.

FIG. 3 illustrates a functional block of an image blur correction system of the digital camera 1.

The shake detection unit 20 includes an angular velocity sensor 22x that detects an angular velocity about the x-axis (pitch axis) perpendicular to the optical axis (z-axis) of the imaging optical system 2, an angular velocity sensor 22y that detects an angular velocity about the y-axis (yaw axis) perpendicular to the z-axis and the x-axis, an integrating filter 23x that converts the output of the angular velocity sensor 22x into the amount of rotational shake about the x-axis, and an integrating filter 23y that converts the output of the angular velocity sensor 22y into the amount of rotational shake about the y-axis.

In the digital camera 1 according to this example, a correction lens 24 for correcting an image blur on the imaging surface of the imaging element 3 is incorporated into the imaging optical system 2. The correction driving unit 21 includes an actuator and an actuator driver and moves the correction lens 24 in the plane perpendicular to the optical axis. The correction driving unit 21 may be configured so as to move the imaging element 3, instead of the correction lens 24. In this case, the correction driving unit 21 can also correct an image blur.

The control unit 6 includes a gain adjustment unit 25 that multiplies the amount of rotational shake about the x-axis and the amount of rotational shake about the y-axis which are detected by the shake detection unit 20 by an appropriate correction gain and a correction control unit 26 that calculates the amount of movement of the correction lens 24 in the directions of the x-axis and the y-axis which correspond to the amount of shake on the basis of the output of the gain adjustment unit 25.

A position sensor 27 detects the position of the correction lens 24 in the directions of the x-axis and the y-axis and the position of the correction lens 24 detected by the position sensor 27 is fed back to the correction control unit 26.

When the focus position of the focus lens is determined by the AF processing unit 4, an object distance is acquired by the AF processing unit 4. The object distance acquired by the AF processing unit (distance detection unit) 4 is input to the correction control unit 26.

The correction control unit 26 controls the correction driving unit 21 such that the correction lens 24 is moved to a target position, on the basis of the calculated amount of movement of the correction lens 24 and the position of the correction lens 24 fed back from the position sensor 27. In this way, an image blur caused by the shake of the digital camera 1 is corrected.

The control unit 6 directs the imaging element 3 to continuously perform a plurality of imaging operations in response to an imaging instruction input through the operating unit 8. Then, the correction control unit 26 changes the correction gain which is used to calculate the amount of movement of the correction lens 24 for each imaging operation, depending on the object distance, to correct an image blur caused by a translational shake in addition to the rotational shake.

Figure 4:
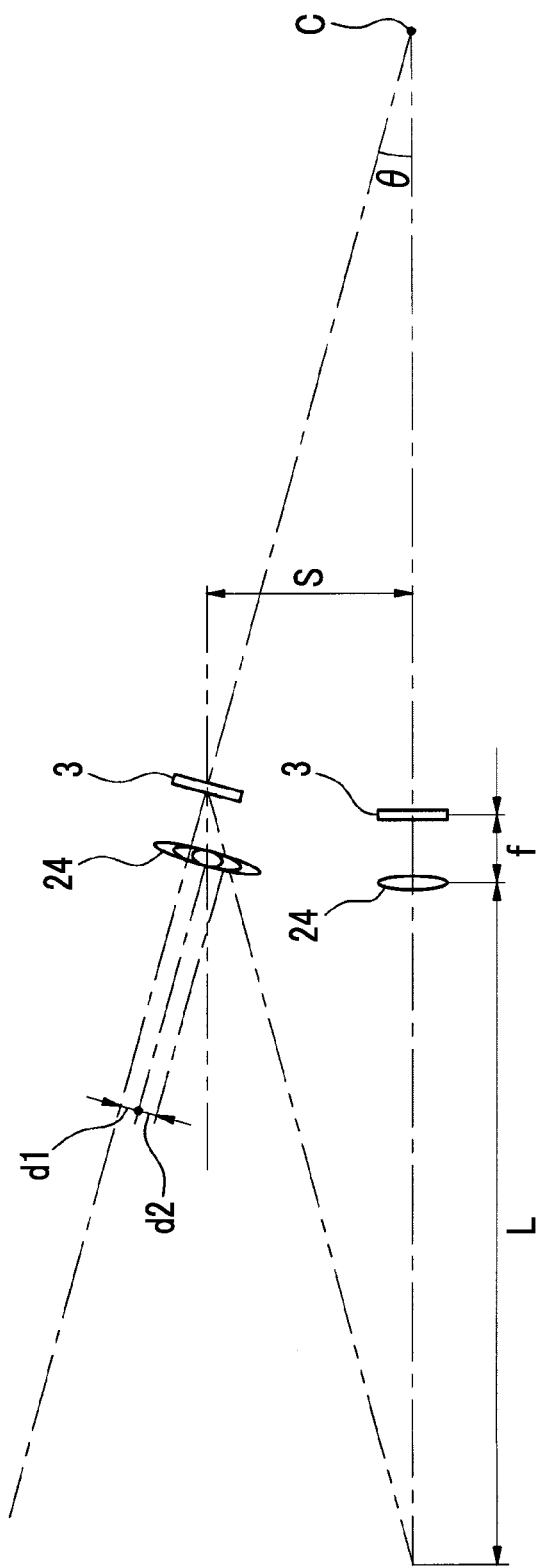
FIG. 4 is a diagram illustrating the relationship between an object distance and the amount of movement of a correction lens in the image blur correction system illustrated in FIG. 3.

FIG. 4 schematically illustrates the relationship between the amount of movement of the correction lens 24 and the object distance.

The shake of the digital camera 1 caused by a hand shake can be typically regarded as rotation about a rotation center C that is located closer to a photographer than the imaging surface of the imaging element 3 and includes a rotational shake at an angle $\theta$ and a translational shake at a distance S.

When a focal length is f and the object distance is L, the amount of movement $d_1$ of the correction lens 24 corresponding to the amount of rotational shake at the angle $\theta$ can be represented by $d_1 \approx f\theta$ and the amount of movement $d_2$ of the correction lens 24 corresponding to the amount of translational shake at the distance S can be represented by $d_2 \approx f \cdot S/L$.

The movement of the correction lens 24 for correcting an image blur is movement in the plane perpendicular to the optical axis, regardless of whether the cause of the image blur is the rotational shake or the translational shake of the digital camera 1. The correction gain that is most suitable for the rotational shake is appropriately increased or decreased to correct the image blur caused by the translational shake in addition to the rotational shake. The above-mentioned expression shows that the amount of movement of the correction lens 24 corresponding to the translational shake relates to the object distance L and the influence of the translational shake increases as the object distance L decreases.

Figure 5:
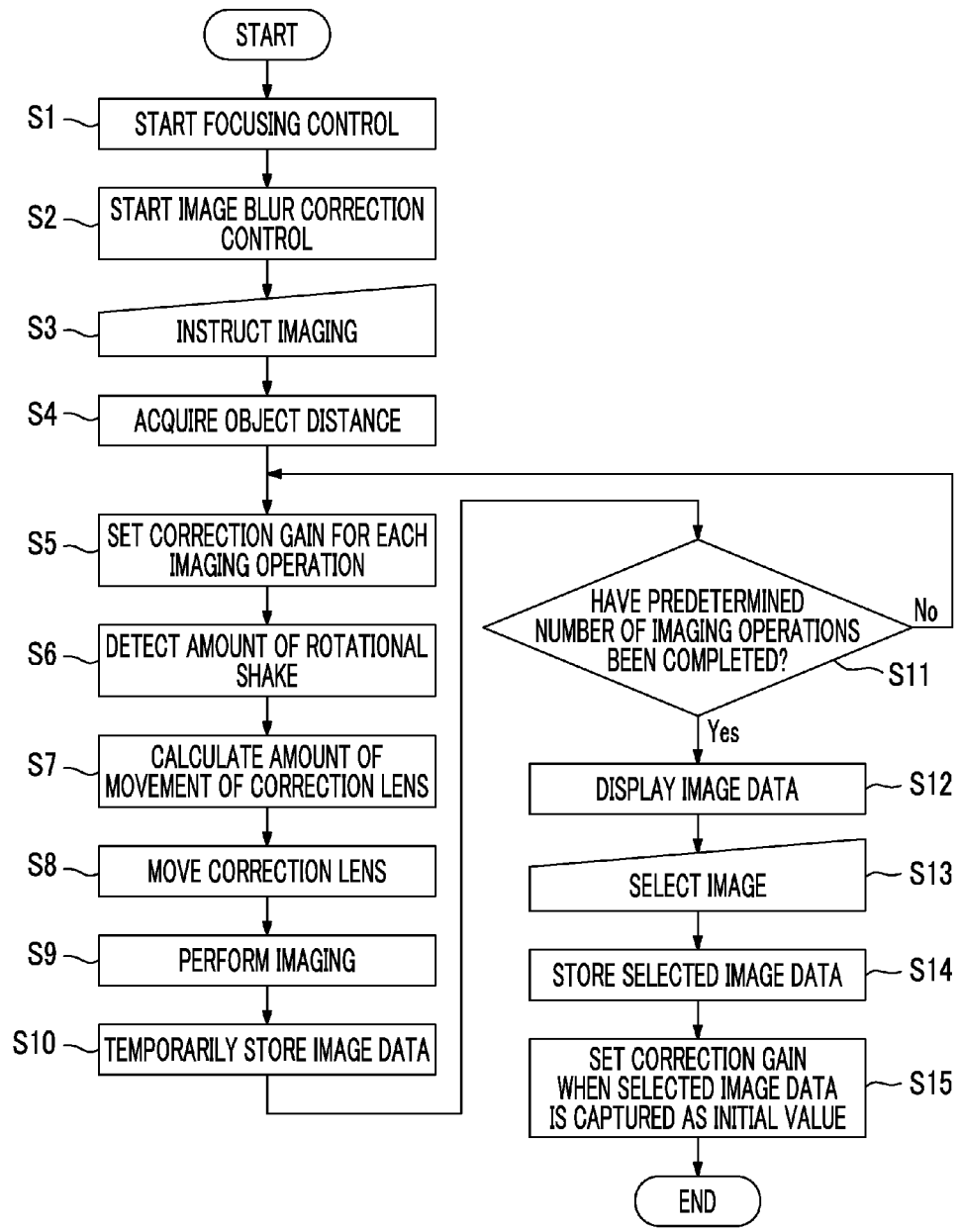
FIG. 5 is a diagram illustrating an example of a process performed by a control unit of the imaging apparatus illustrated in FIG. 1.

FIG. 5 illustrates an example of the process performed by the control unit 6. In the example illustrated in FIG. 5, a predetermined number of imaging operations are performed in response to an imaging instruction.

First, the control unit 6 starts focusing control (Step S1) and the correction control unit 26 of the control unit 6 starts image blur correction control (Step S2). Then, when an imaging instruction is input through the operating unit 8 (Step S3), the control unit 6 performs bracket imaging that continuously performs a predetermined number of imaging operations while changing the correction gain in the image blur correction control.

First, the control unit 6 acquires an object distance from the AF processing unit 4 (Step S4) and sets a correction gain for each imaging operation according to the object distance (Step S5).

For example, the correction gain for each imaging operation can be set by cumulatively adding a difference to an initial value of the correction gain. Specifically, when the initial value of the correction gain is $g_0$ and the difference is $\Delta$ ($\Delta>0$), the correction gain can be set to values before and after the initial value $g_0$. For example, the correction gain is set to $g_0$, $g_0+\Delta$, $g_0-\Delta$, $g_0+2\Delta$, $g_0-2\Delta$, .... In addition, the correction gain can be set by cumulatively multiplying the initial value $g_0$ by a coefficient k (k>1) ($g_0$, $g_0 \times k$, $g_0/k$, $g_0 \times k^2$, $g_0/k^2$, ...). The initial value of the correction gain can be, for example, a value that is optimized by adjustment for the rotational shake in the manufacturing stage of the digital camera 1 and is stored in the main memory 9 (see FIG. 2).

The amount of movement of the correction lens 24 corresponding to the translational shake relates to the object distance as described above. The influence of the translational shake increases as the object distance decreases. Therefore, it is preferable that, as the object distance decreases, a variation in the correction gain increases, that is, the difference between the maximum value and the minimum value of the correction gain increases. In this case, it is possible to reliably reduce an image blur caused by the translational shake in addition to an rotational shake. In this example in which a predetermined number of imaging operations are performed in response to an imaging instruction, as the object distance decreases, the difference $\Delta$ or the coefficient k increases and a variation between the correction gains of two adjacent images among the continuously captured images in the arrangement of a chronological or reverse chronological order of imaging. Therefore, a variation in the correction gain can increase as the object distance decreases.

The correction control unit 26 of the control unit 6 acquires the amount of rotational shake of the digital camera 1 from the shake detection unit 20 (Step S6), multiplies the acquired amount of rotational shake by the correction gain to calculate the amount of movement of the correction lens 24 corresponding to the amount of shake (Step S7).

Then, the correction control unit 26 controls the correction driving unit 21 such that the correction lens 24 is moved to a target position, on the basis of the calculated amount of movement of the correction lens 24 and the position of the correction lens 24 fed back from the position sensor 27 (Step S8).

The control unit 6 directs the imaging element 3 to capture images while performing image blur correction control using the correction control unit 26 (Step S9) and temporarily stores the captured image data in, for example, a frame memory of the signal processing unit 7 (see FIG. 2) or the storage unit 10 (see FIG. 2) (Step S10).

The control unit 6 determines whether a predetermined number of imaging operations have been completed (Step S11). In a case in which a predetermined number of imaging operations have not been completed, the process returns to Step S5 and the control unit 6 selects a correction gain corresponding to the next imaging operation, performs image blur correction and imaging, and temporarily stores image data.

After a predetermined number of imaging operations are completed, the control unit 6 displays a plurality of image data items stored in Step S10 on the display unit 11 (see FIG. 2) (Step S12). The display aspect of the image is not particularly limited. For example, a plurality of images may be sequentially displayed, the minified images of the plurality of images may be displayed side by side, or partial images obtained by extracting a portion (for example, a central portion) of each of the plurality of images may be displayed side by side.

For a plurality of images captured while the correction gain is changed, there is a difference in the effectiveness of the correction of an image blur according to the correction gain for each imaging operation. One image selected from the plurality of images, typically, an image with the smallest amount of image blur is selected by the photographer through the operating unit 8 (see FIG. 2) (Step S13).

The control unit 6 stores one image data item selected in Step S13 in the storage unit 10 and discards the other image data (Step S14).

Then, the control unit 6 stores the value of the correction gain when the selected image data is acquired as the initial value of the correction gain in the next bracket imaging operation in the main memory 9 (Step S15).

Whenever the bracket imaging operation is performed, a value that is optimized by adjustment for a rotational shake may be used as the initial value of the correction gain. In addition, the range of the correction gain when the selected image data is acquired may be used as the initial value of the correction gain in the next bracket imaging operation. In this case, it is possible to adapt the range (from the maximum value to the minimum value) of the correction gain to the imaging skills of the photographer. In this way, it is possible to reliably reduce an image blur.

In the example illustrated in FIG. 5, the photographer selects one image data item from a plurality of images acquired by bracket imaging. However, the control unit 6 may be configured to automatically select an image with the highest evaluation value on the basis of the evaluation values for the sharpness of each of the plurality of images. Contrast can be given as an example of the evaluation value for sharpness. In a case in which contrast is used as the evaluation value, for example, the AF processing unit 4 (see FIG. 2) can function as an evaluation unit that evaluates the contrast of an image.

As such, according to the digital camera 1, an acceleration sensor for detecting a translational shake is not necessary. Therefore, it is possible to correct an image blur caused by a rotational shake and a translational shake with a simple structure.

Figure 6:
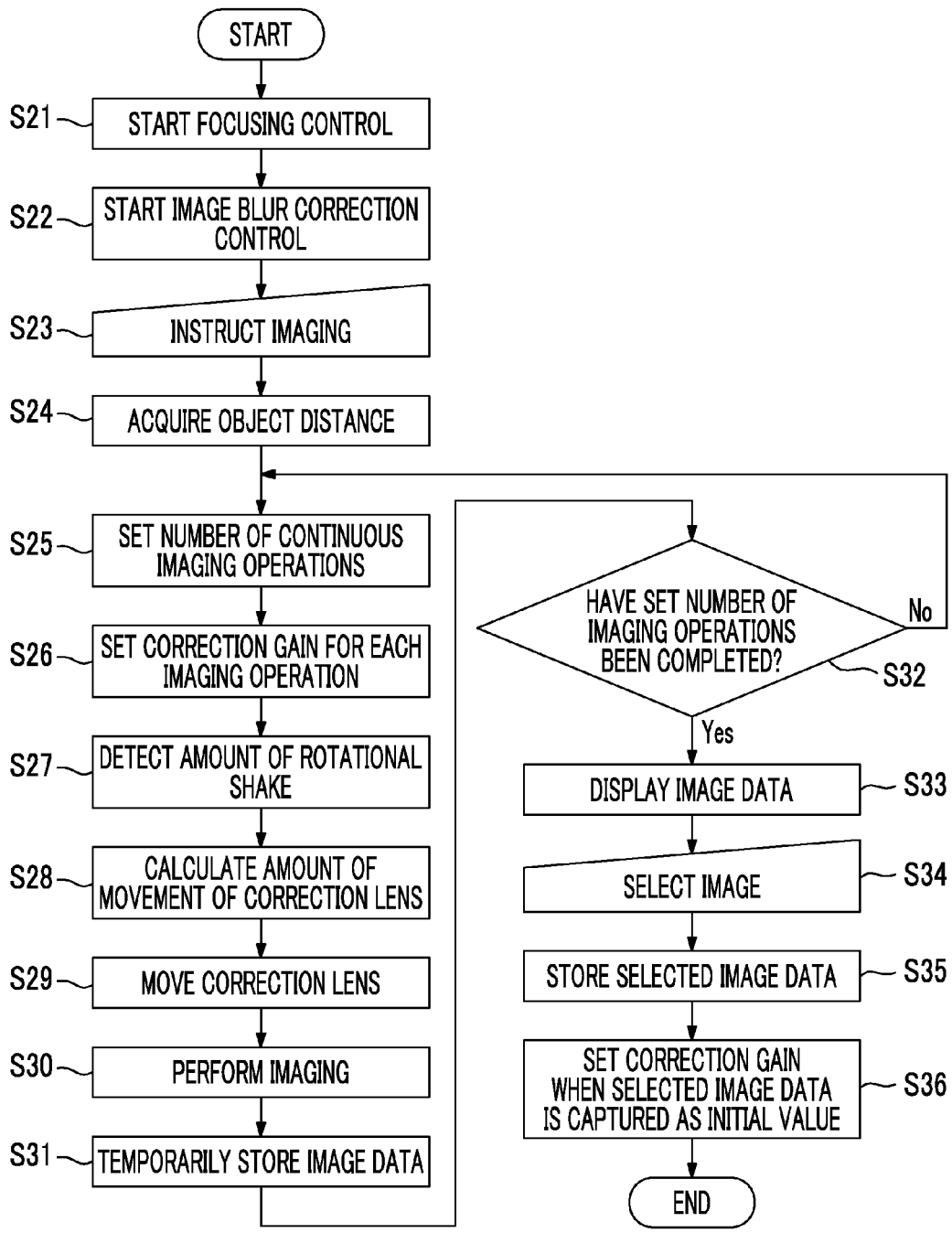
FIG. 6 is a diagram illustrating another example of the process performed by the control unit of the imaging apparatus illustrated in FIG. 1.

FIG. 6 illustrates another example of the process performed by the control unit 6.

In the example illustrated in FIG. 6, the number of continuous imaging operations performed in response to an imaging instruction is changed depending on an object distance.

First, the control unit 6 starts focusing control (Step S21) and the correction control unit 26 of the control unit 6 starts image blur correction control (Step S22). Then, when an imaging instruction is input through the operating unit 8 (Step S23), the control unit 6 performs bracket imaging that continuously performs a plurality of imaging operations while changing the correction gain in the image blur correction control.

First, the control unit 6 acquires an object distance from the AF processing unit 4 (Step S24), sets the number of continuous imaging operations according to the object distance (Step S25), and sets a correction gain for each imaging operation (Step S26).

The correction gain for each imaging operation can be set by cumulatively adding the difference $\Delta$ to the initial value $g_0$ of the correction gain or by cumulatively multiplying the initial value $g_0$ by the coefficient k such that the correction gain is values before and after the initial value $g_0$, as described above.

The amount of movement of the correction lens 24 corresponding to a translational shake relates to the object distance as described above. The influence of the translational shake increases as the object distance decreases. Therefore, it is preferable that, as the object distance decreases, a variation in the correction gain increases. In this example in which the number of continuous imaging operations performed in response to an imaging instruction is changed depending on the object distance, as the object distance decreases, the number of continuous imaging operations increases. Therefore, a variation in the correction gain can increase as the object distance decreases.

The correction control unit 26 of the control unit 6 acquires the amount of rotational shake of the digital camera 1 from the shake detection unit 20 (Step S27), multiplies the acquired amount of rotational shake by the correction gain to calculate the amount of movement of the correction lens 24 corresponding to the amount of shake (Step S28).

Then, the correction control unit 26 controls the correction driving unit 21 such that the correction lens 24 is moved to a target position, on the basis of the calculated amount of movement of the correction lens 24 and the position of the correction lens 24 fed back from the position sensor 27 (Step S29).

The control unit 6 directs the imaging element 3 to capture images while performing image blur correction control using the correction control unit 26 (Step S30) and temporarily stores captured image data in, for example, the frame memory of the signal processing unit 7 (see FIG. 2) or the storage unit 10 (see FIG. 2) (Step S31).

The control unit 6 determines whether the number of imaging operations set in Step S25 has been completed (Step S32). In a case in which a predetermined number of imaging operations have not been completed, the process returns to Step S26 and the control unit 6 selects a correction gain corresponding to the next imaging operation, performs image blur correction and imaging, and temporarily stores image data.

The operation of the control unit 6 after the number of imaging operations set in Step S25 is completed can be the same as that in the example illustrated in FIG. 5.

In the setting of the correction gain for each imaging operation, the difference $\Delta$ or the coefficient k may increase as the object distance decrease or the number of continuous imaging operations may increase as the object distance decrease.

The digital camera 1 has been described above as an example of the imaging apparatus. Next, an embodiment of a smart phone with a camera as the imaging apparatus will be described.

Figure 7:
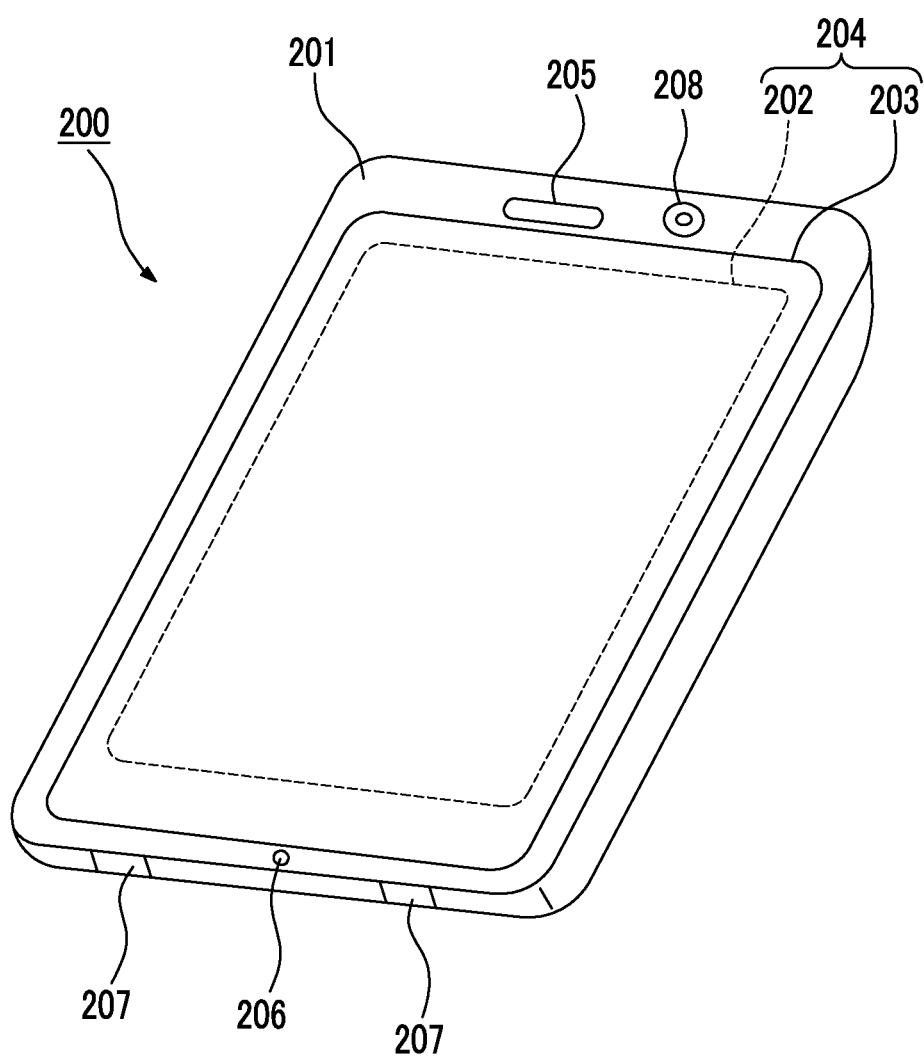
FIG. 7 is a diagram illustrating the outward appearance of an example of an imaging apparatus for describing the embodiment of the invention.

FIG. 7 illustrates the outward appearance of a smart phone 200 which is an embodiment of the imaging apparatus according to the invention.

The smart phone 200 illustrated in FIG. 7 includes a housing 201 with a flat panel shape. The smart phone 200 comprises a display input unit 204 having a display panel 202 as a display unit and an operation panel 203 as an input unit which are integrally formed on one surface of the housing 201. The housing 201 includes a speaker 205, a microphone 206, an operating unit 207, and a camera unit 208. However, the configuration of the housing 201 is not limited thereto. For example, the display unit and the input unit may be independently provided or the housing 201 may have a folding structure or a sliding structure.

Figure 8:
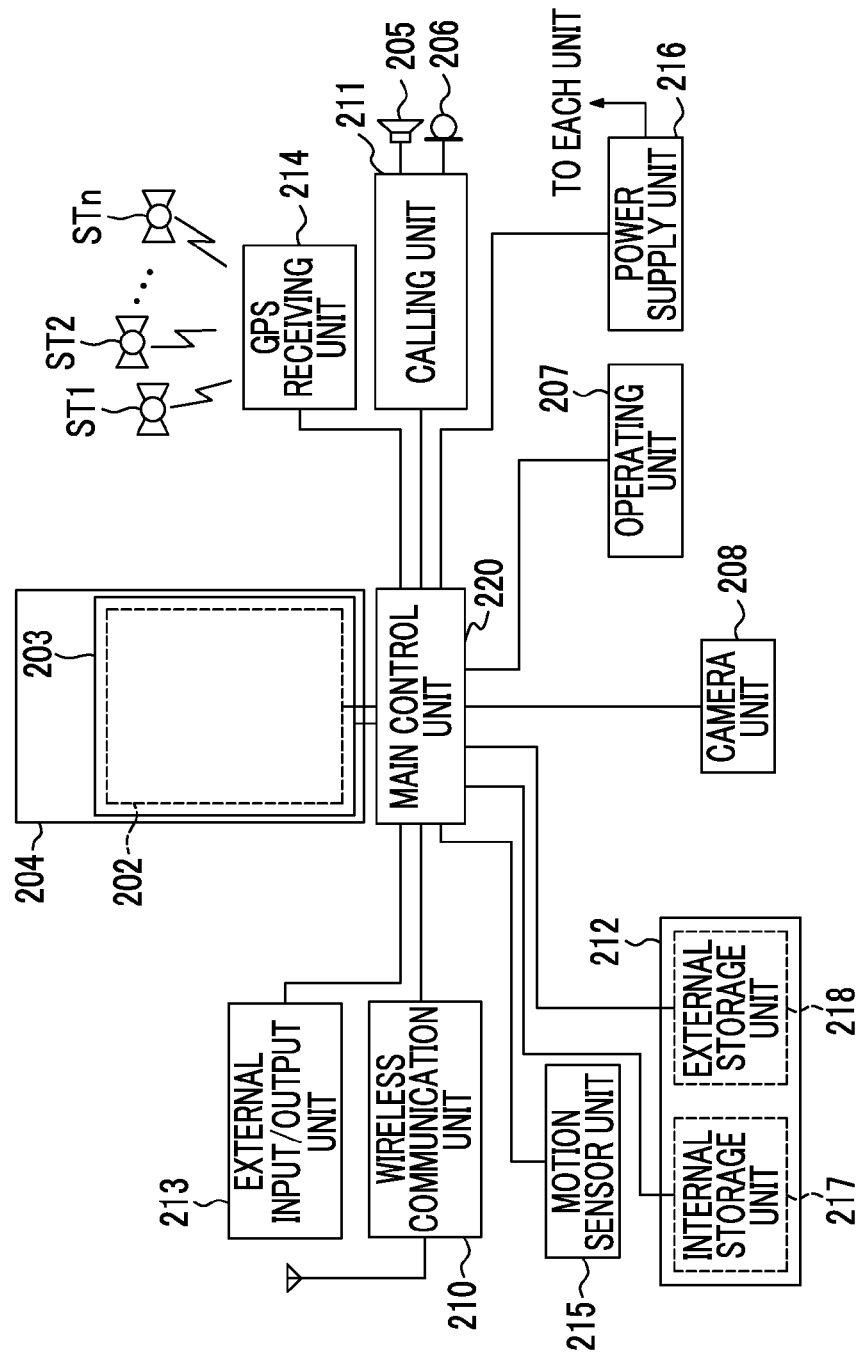
FIG. 8 is a block diagram illustrating the structure of the imaging apparatus illustrated in FIG. 7.

FIG. 8 illustrates the structure of the smart phone 200 illustrated in FIG. 7.

As illustrated in FIG. 8, the smart phone 200 comprises, as main components, a wireless communication unit 210, the display input unit 204, a calling unit 211, the operating unit 207, the camera unit 208, a storage unit 212, an external input/output unit 213, a global positioning system (GPS) receiving unit 214, a motion sensor unit 215, a power supply unit 216, and a main control unit 220. In addition, the smart phone 200 has, as a main function, a wireless communication function which performs mobile wireless communication through a base station apparatus BS (not illustrated) and a mobile communication network NW (not illustrated).

The wireless communication unit 210 performs wireless communication with the base station apparatus BS which is accommodated in the mobile communication network NW in response to an instruction from the main control unit 220. The wireless communication is used to transmit and receive various types of file data, such as voice data and image data, and electronic mail data or to receive, for example, web data or streaming data.

The display input unit 204 is a so-called touch panel that displays, for example, images (still images and moving images) or text information to visually transmit information to the user and detects the user's operation for the displayed information under the control of the main control unit 220 and comprises the display panel 202 and the operation panel 203.

The display panel 202 uses, for example, a liquid crystal display (LCD) or an organic electro-luminescence display (OELD) as a display device.

The operation panel 203 is a device that is provided such that an image displayed on a display surface of the display panel 202 can be visually recognized and detects one or a plurality of coordinate points operated by a finger of the user or a stylus. When the device is operated by a finger of the user or a stylus, a detection signal which is generated by the operation is output to the main control unit 220. Then, the main control unit 220 detects an operation position (coordinates) on the display panel 202 on the basis of the received detection signal.

As illustrated in FIG. 7, the display panel 202 and the operation panel 203 of the smart phone 200 that is exemplified as an embodiment of the imaging apparatus according to the invention are integrated to form the display input unit 204 and the operation panel 203 is provided so as to completely cover the display panel 202.

In a case in which this structure is used, the operation panel 203 may have a function of detecting the user's operation even in a region other than the display panel 202. In other words, the operation panel 203 may comprise a detection region (hereinafter, referred to as a display region) for an overlap portion which overlaps the display panel 202 and a detection region (hereinafter, referred to as a non-display region) for an outer edge portion which does not overlap the display panel 202.

The size of the display region may be exactly equal to the size of the display panel 202. However, the sizes are not necessarily equal to each other. The operation panel 203 may comprise two sensitive regions, that is, an outer edge portion and an inner portion other than the outer edge portion. The width of the outer edge portion is appropriately designed according to, for example, the size of the housing 201. Examples of a position detection method which is used in the operation panel 203 include a matrix switching method, a resistive film method, a surface elastic wave method, an infrared method, an electromagnetic induction method, and a capacitive sensing method. Any of the methods may be used.

The calling unit 211 comprises the speaker 205 and the microphone 206. The calling unit 211 converts the voice of the user which is input through the microphone 206 into voice data which can be processed by the main control unit 220 and outputs the converted voice data to the main control unit 220. In addition, the calling unit 211 decodes voice data received by the wireless communication unit 210 or the external input/output unit 213 and outputs the decoded voice data from the speaker 205. As illustrated in FIG. 7, for example, the speaker 205 can be mounted on the same surface as the display input unit 204 and the microphone 206 can be mounted on the side surface of the housing 201.

The operating unit 207 is a hardware key which uses, for example, a key switch and receives instructions from the user. For example, as illustrated in FIG. 7, the operating unit 207 is a push button switch which is mounted on the side surface of the housing 201 of the smart phone 200, is turned on when it is pressed by, for example, a finger, and is turned off by the restoring force of a spring when the finger is taken off.

The storage unit 212 stores a control program or control data of the main control unit 220, application software, address data which is associated with, for example, the names or phone numbers of communication partners, transmitted and received electronic mail data, web data which is downloaded by web browsing, or downloaded content data. In addition, the storage unit 212 temporarily stores, for example, streaming data. The storage unit 212 includes an internal storage unit 217 which is provided in the smart phone and an external storage unit 218 which has a slot for a detachable external memory. The internal storage unit 217 and the external storage unit 218 forming the storage unit 212 may be implemented by a storage medium, such as a flash memory type, a hard disk type, a multimedia-card-micro-type memory, a card-type memory (for example, a MicroSD (registered trademark) memory), a random access memory (RAM), or a read only memory (ROM).

The external input/output unit 213 functions as an interface with all of the external apparatuses connected to the smart phone 200 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB) (registered trademark) network, or a ZigBee (registered trademark) network).

Examples of the external apparatus connected to the smart phone 200 include a wired/wireless headset, a wired/wireless external charger, a wired/wireless data port, a memory card which is connected through a card socket, a subscriber identity module (SIM) card/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit 213 can transmit data which is received from the external apparatus to each component of the smart phone 200 or can transmit data in the smart phone 200 to the external apparatus.

The GPS receiving unit 214 receives GPS signals transmitted from GPS satellites ST1 to STn and performs a position measurement process on the basis of a plurality of received GPS signals to detect a position including the latitude, longitude, and height of the smart phone 200, in response to an instruction from the main control unit 220. When the GPS receiving unit 214 can acquire positional information from the wireless communication unit 210 or the external input/output unit 213 (for example, a wireless LAN), it can detect the position using the positional information.

The motion sensor unit 215 comprises, for example, a triaxial acceleration sensor and detects the physical movement of the smart phone 200 in response to an instruction from the main control unit 220. When the physical movement of the smart phone 200 is detected, the moving direction or acceleration of the smart phone 200 is detected. The detection result is output to the main control unit 220.

The power supply unit 216 supplies power which is stored in a battery (not illustrated) to each unit of the smart phone 200 in response to an instruction from the main control unit 220.

The main control unit 220 comprises a microprocessor, operates on the basis of the control program or control data stored in the storage unit 212, and controls the overall operation of each unit of the smart phone 200. The main control unit 220 has an application processing function and a mobile communication control function of controlling each unit of a communication system in order to perform voice communication or data communication through the wireless communication unit 210.

The application processing function is implemented by the operation of the main control unit 220 based on the application software which is stored in the storage unit 212. Examples of the application processing function include an infrared communication function which controls the external input/output unit 213 such that data communication with an opposing apparatus is performed, an electronic mail function which transmits and receives electronic mail, and a web browsing function which browses web pages.

The main control unit 220 has, for example, an image processing function which displays an image on the display input unit 204 on the basis of image data (still image data or moving image data) such as received data or downloaded streaming data. The image processing function means the function of the main control unit 220 decoding the image data, performing image processing on the decoding result, and displaying the image on the display input unit 204.

The main control unit 220 performs display control for the display panel 202 and operation detection control for detecting the operation of the user through the operating unit 207 and the operation panel 203. The main control unit 220 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 202.

The main control unit 220 performs the operation detection control to detect the operation of the user input through the operating unit 207, to receive an operation for the icon or the input of a character string to an input field of the window through the operation panel 203, or to receive a request to scroll the displayed image through the scroll bar.

In addition, the main control unit 220 has a touch panel control function that performs the operation detection control to determine whether the position of an operation for the operation panel 203 is an overlap portion (display region) which overlaps the display panel 202 or an outer edge portion (non-display region) which does not overlap the display panel 202 other than the overlap portion and controls a sensitive region of the operation panel 203 or the display position of the software key.

The main control unit 220 can detect a gesture operation for the operation panel 203 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 208 includes the structures of the imaging optical system 2, the imaging element 3, the AF processing unit 4, the control unit 6, the signal processing unit 7, the main memory 9, the shake detection unit 20, the correction driving unit 21, the correction lens 24, the correction control unit 26, and the position sensor 27 in the digital camera 1 illustrated in FIG. 2.

The image data generated by the camera unit 208 can be recorded in the storage unit 212 or can be output through the external input/output unit 213 or the wireless communication unit 210.

In the smart phone 200 illustrated in FIG. 7, the camera unit 208 is mounted on the same surface as the display input unit 204. However, the mounting position of the camera unit 208 is not limited thereto. For example, the camera unit 208 may be mounted on the rear surface of the display input unit 204.

The camera unit 208 can be used for various functions of the smart phone 200. For example, the image acquired by the camera unit 208 can be displayed on the display panel 202 or the image acquired by the camera unit 208 can be used as one of the operation inputs of the operation panel 203.

When the GPS receiving unit 214 detects the position, the position may be detected with reference to the image from the camera unit 208. In addition, the optical axis direction of the camera unit 208 in the smart phone 200 may be determined or the current usage environment may be determined, with reference to the image from the camera unit 208, using the triaxial acceleration sensor or without using the triaxial acceleration sensor. Of course, the image from the camera unit 208 may be used in the application software.

In addition, for example, the position information acquired by the GPS receiving unit 214, the voice information acquired by the microphone 206 (for example, the voice information may be converted into text information by the main control unit), and the posture information acquired by the motion sensor unit 215 may be added to still image data or moving image data and the image data may be recorded in the storage unit 212 or may be output through the external input/output unit 213 or the wireless communication unit 210.

In the smart phone 200 having the above-mentioned structure, it is possible to correct an image blur caused by a rotational shake and a translational shake, without making the structure of the camera unit 208 complicated.

As described above, an imaging apparatus disclosed in the specification comprises a distance detection unit that detects an object distance, a shake detection unit that detects an amount of shake of the imaging apparatus, a driving unit that moves an optical element or an imaging element included in an imaging optical system to correct an image blur caused by a shake of the imaging apparatus, and a control unit that calculates an amount of movement of the optical element or the imaging element moved by the driving unit based on the amount of shake detected by the shake detection unit and controls the driving unit. The control unit directs the imaging element to continuously capture images in response to an imaging instruction and changes a correction gain which is used to calculate the amount of movement for each imaging operation, depending on the object distance detected by the distance detection unit.

The control unit increases a variation in the correction gain as the object distance decreases.

The control unit increases a variation between the correction gains of two adjacent images among the continuously captured images in an arrangement of a chronological or reverse chronological order of imaging as the object distance decreases.

The control unit changes the number of continuous imaging operations, depending on the object distance.

The control unit increases the number of continuous imaging operations as the object distance decreases.

The control unit increases a variation between the correction gains of two adjacent images among the continuously captured images in an arrangement of a chronological or reverse chronological order of imaging and increase number of continuous imaging operations, as the object distance decreases.

The control unit records one image selected from a plurality of images which are acquired by the continuous imaging operations in a storage unit and uses a value of the correction gain when the selected image is acquired as an initial value of the correction gain in a next continuous imaging operation.

A user selects the one image from the plurality of images and the imaging apparatus further comprises an operating unit that is used to select an image.

The imaging apparatus further comprises an evaluation unit that evaluates the sharpness of each of the plurality of images and the control unit selects an image with the highest evaluation value calculated by the evaluation unit.

The imaging apparatus corrects an image blur caused by the shake of the imaging apparatus including a translational shake.

An imaging method disclosed in the specification detects the amount of shake of an imaging apparatus, calculates the amount of movement of an optical element or an imaging element included in an imaging optical system based on the amount of shake, and moves the optical element or the imaging element to acquire an image in which an image blur caused by a shake of the imaging apparatus is corrected. The imaging method comprises a distance detection step of detecting an object distance and an imaging step of continuously capturing images in response to an imaging instruction and changing a correction gain which is used to calculate the amount of movement for each imaging operation, depending on the object distance detected in the distance detection step.

In the imaging step, a variation in the correction gain increases as the object distance decreases.

In the imaging step, a variation between the correction gains of two adjacent images among the continuously captured images in an arrangement of a chronological or reverse chronological order of imaging increases as the object distance decreases.

In the imaging step, the number of continuous imaging operations is changed, depending on the object distance.

In the imaging step, the number of continuous imaging operations increases as the object distance decreases.

In the imaging step, a variation between the correction gains of two adjacent images among the continuously captured images in an arrangement of a chronological or reverse chronological order of imaging and the number of continuous imaging operations increase as the object distance decreases.

In the imaging step, one image selected from a plurality of images which are acquired by the continuous imaging operations is recorded in a storage unit and the value of the correction gain when the selected image is acquired is used as an initial value of the correction gain in the next continuous imaging operation.

INDUSTRIAL APPLICABILITY

The invention can be used in various types of electronic apparatuses in which an imaging element captures images through an imaging optical system.

The embodiment of the invention has been described in detail above. However, the embodiment of the invention is just an example and various modifications and changes of the invention can be made without departing from the scope and spirit of the invention. This application is based on JP2014-236589, filed on Nov. 21, 2014, the content of which is incorporated herein by reference.

What is claimed is:

1. An imaging apparatus comprising:
at least one hardware processor configured to detect an object distance; and
a shake detector configured to detect an amount of shake of the imaging apparatus,
wherein the processor is further configured to:
control movement of an optical element or an imaging element included in an imaging optical system to correct an image blur caused by a shake of the imaging apparatus;
calculate an amount of movement of the optical element or the imaging element moved based on the amount of shake detected by the shake detector and control the moving of the optical element,
direct the imaging element to continuously capture images in response to an imaging instruction and change a correction gain which is used to calculate the amount of movement for each imaging operation, depending on the object distance detected, and
wherein the processor changes the correction gain by multiply the amount of shake of the imaging apparatus detected by the shake detector by the correction gain, to obtain a gain output, and calculates the amount of movement of the optical element or the imaging element based on the gain output.

2. The imaging apparatus according to claim 1, wherein the at least one processor is further configured to increase a variation in the correction gain as the object distance decreases.

3. The imaging apparatus according to claim 1, wherein at least one processor is further configured to increase a variation between the correction gains of two adjacent images among the continuously captured images in an arrangement of a chronological or reverse chronological order of imaging as the object distance decreases.

4. The imaging apparatus according to claim 1, wherein the at least one processor is further configured to change number of continuous imaging operations, depending on the object distance.

5. The imaging apparatus according to claim 4, wherein the at least one processor is further configured to increase the number of continuous imaging operations as the object distance decreases.

6. The imaging apparatus according to claim 1, wherein the at least one processor is further configured to increase a variation between the correction gains of two adjacent images among the continuously captured images in an arrangement of a chronological or reverse chronological order of imaging and increase number of continuous imaging operations, as the object distance decreases.

7. The imaging apparatus according to claim 1, wherein the at least one processor is further configured to record one image selected from a plurality of images which are acquired by the continuous imaging operations in a storage unit and uses a value of the correction gain when the one image is acquired as an initial value of the correction gain in a next continuous imaging operation.

8. The imaging apparatus according to claim 7, further comprising:
a user interface that is used to select an image,
wherein a user selects the one image from the plurality of images.

9. The imaging apparatus according to claim 7, further comprising:
at least one processor is further configured to evaluate a sharpness of each of the plurality of images, and to select an image with a highest evaluation value.

10. The imaging apparatus according to claim 1, wherein an image blur caused by the shake of the imaging apparatus including a translational shake is corrected.

11. An imaging method that detects an amount of shake of an imaging apparatus, calculates an amount of movement of an optical element or an imaging element included in an imaging optical system based on the amount of shake, and moves the optical element or the imaging element to acquire an image in which an image blur caused by a shake of the imaging apparatus is corrected, the method comprising:
- a distance detection step of detecting an object distance; and
- an imaging step of continuously capturing images in response to an imaging instruction and changing a correction gain which is used to calculate the amount of movement for each imaging operation, depending on the object distance detected in the distance detection step,
- wherein the changing of the correction gain comprises multiplying the amount of shake of the imaging apparatus by the correction gain, to obtain a gain output, and calculating the amount of movement of the optical element or the imaging element based on the gain output.

12. The imaging method according to claim 11,
wherein, in the imaging step, a variation in the correction gain increases as the object distance decreases.

13. The imaging method according to claim 11,
wherein, in the imaging step, a variation between the correction gains of two adjacent images among the continuously captured images in an arrangement of a chronological or reverse chronological order of imaging increases as the object distance decreases.

14. The imaging method according to claim 11,
wherein, in the imaging step, number of continuous imaging operations is changed, depending on the object distance.

15. The imaging method according to claim 14,
wherein, in the imaging step, the number of continuous imaging operations increases as the object distance decreases.

16. The imaging method according to claim 11,
wherein, in the imaging step, a variation between the correction gains of two adjacent images among the continuously captured images in an arrangement of a chronological or reverse chronological order of imaging and number of continuous imaging operations increase, as the object distance decreases.

17. The imaging method according to claim 11,
wherein, in the imaging step, one image selected from a plurality of images which are acquired by the continuous imaging operations is recorded in a storage unit and a value of the correction gain when the one image is acquired is used as an initial value of the correction gain in a next continuous imaging operation.

* * * * *